(12) United States Patent
Hayes

(10) Patent No.: US 8,423,564 B1
(45) Date of Patent: Apr. 16, 2013

(54) METHODS AND APPARATUS FOR MANAGING AND UPDATING STORED INFORMATION

(75) Inventor: Claude Lee Hayes, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 74 days.

(21) Appl. No.: 11/554,654

(22) Filed: Oct. 31, 2006

(51) Int. Cl.
*G06F 7/00* (2006.01)
*G06F 17/00* (2006.01)
*G06F 17/30* (2006.01)
*G06F 15/16* (2006.01)

(52) U.S. Cl.
USPC .......................................... 707/758; 707/611

(58) Field of Classification Search .................. 707/611, 707/758
See application file for complete search history.

(56) References Cited

U.S. PATENT DOCUMENTS

| | | | | |
|---|---|---|---|---|
| 5,261,089 | A * | 11/1993 | Coleman et al. | 707/8 |
| 6,078,999 | A * | 6/2000 | Raju et al. | 711/161 |
| 6,253,193 | B1 * | 6/2001 | Ginter et al. | 705/57 |
| 6,304,860 | B1 * | 10/2001 | Martin et al. | 705/43 |
| 2004/0181560 | A1 * | 9/2004 | Romanufa et al. | 707/202 |
| 2004/0199463 | A1 * | 10/2004 | Deggendorf | 705/39 |

OTHER PUBLICATIONS

J. Jeenel. Programming for Digitial Computers. McGraw-Hill, New York, 1959, Section 6.2, pp. 293-321 and Section 9.2, pp. 409-421.*
J. Jeenel. Programming for Digitial Computers. McGraw-Hill, New York, 1959, Section 2.3, pp. 17-29, Sections 5.5, 6.1 and 6.2, pp. 280-321 and Section 9.2, pp. 409-421.*
J. J Jeenel. Programming for Digitial Computers. McGraw-Hill, New York, 1959, Section 2.3, pp. 17-29, Sections 5.5, 6.1 and 6.2, pp. 280-321 and Section 9.2, pp. 409-421.*
James Bradley, Introduction to Data Base Management in Business (Second Edition), Holt, Rhinehart & Winston, New York, 1987, Chapters 1 and 6, pp. 1-11 and 183-220.*

* cited by examiner

*Primary Examiner* — Greta Robinson
*Assistant Examiner* — Brain E. Weinrich
(74) *Attorney, Agent, or Firm* — Peter Priest; Harden E. Stevens

(57) ABSTRACT

A method and systems are provided for managing database data. A data repository stores existing immediate mode data in the form of immediate mode database records. Transaction mode database records for modifying and adding to the immediate mode records are created and stored, with the transaction mode records being organized into transactions. Each transaction includes a definition, such as a transaction definition record, and transaction mode records are associated with a transaction using a field in each transaction mode record including a reference to a transaction. A transaction can be posted, causing values stored in the transaction mode records associated with the transaction to be used to create added or modified immediate mode records. Transactions can also be used in operations providing views to show the effects of the transaction mode records, or to create data structures for export.

3 Claims, 10 Drawing Sheets

| | RecID | Product ID | Price | Product Description | RecActive | TransID | RecParent ID | RecParent Edit | RecParent Active |
|---|---|---|---|---|---|---|---|---|---|
| 202A | 001 | 12580 | 3.75 | Superfish Tuna - 6oz | 1 | NULL | NULL | NULL | NULL |
| 202B | 002 | 18765 | 4.50 | Value Coffee - 16oz | 1 | NULL | NULL | NULL | NULL |
| 202C | 003 | 16755 | 2.59 | Gem brownie mix | 1 | NULL | NULL | NULL | NULL |
| 202D | 004 | 28568 | 1.75 | Grind Flour - 5lb | 1 | NULL | NULL | NULL | NULL |
| 202E | 005 | 98583 | 2.65 | Super Pudding - 12 | 1 | NULL | NULL | NULL | NULL |
| 202F | 006 | 12580<br>NULL | 3.75 | Superfish Tuna - 6oz<br>NULL | 1 | 1 | 001 | 1 | 0 |
| 202G | 007 | 18765<br>NULL | 4.10 | Value Coffee - 16oz<br>NULL | 1 | 1 | 002 | 1 | 1 |
| 202H | 008 | 16755<br>NULL | 2.39 | Gem brownie mix<br>NULL | 1 | 1 | 003 | 1 | 1 |
| 202I | 009 | 28568<br>NULL | 1.85 | Grind Flour - 5lb<br>NULL | 1 | 1 | 004 | 1 | 1 |
| 202J | 101 | 32586 | 2.20 | Mini Brownies - 12oz | 1 | 3 | NULL | 0 | NULL |
| 202K | 102 | 12580<br>NULL | 3.75 | Superfish Tuna - 6oz<br>NULL | 0 | 3 | 001 | 1 | 0 |
| 202L | 007 | 18765<br>NULL | 4.10 | Value Coffee - 16oz<br>NULL | 1 | 3 | 002 | 1 | 1 |
| 202M | 008 | 16755<br>NULL | 2.39 | Gem brownie mix<br>NULL | 1 | 3 | 003 | 1 | 1 |

FIG. 2

| TransID | Entry Date | Posting Date | Start Date | End Date | Sequence | Trans Name | Trans Description |
|---|---|---|---|---|---|---|---|
| 1 | 3/4/06 | NULL | 3/11/06 | 3/18/06 | 1 | Location A specials week 1 | Weekly price specials and promotions |
| 2 | 3/4/06 | NULL | 3/18/06 | 3/25/06 | 3 | Location A specials week 2 | Weekly price specials and promotions |
| 3 | 3/6/06 | 3/25/06 | NULL | NULL | 4 | General Update 1 | Baseline price updates |
| 4 | 3/6/06 | NULL | 3/11/06 | 3/18/06 | 2 | Location B and C specials week 1 | Weekly price specials and promotions |
| 5 | 3/8/06 | 4/1/06 | NULL | NULL | 5 | General Update 2 | Baseline price updates |

FIG. 3

|  | 404A | 404B | 404C | 404D |
|---|---|---|---|---|
|  | HdrID | Product ID | Price | Product Description |
| 402A | ~~001~~ | ~~12580~~ | ~~3.75~~ | ~~Superfish Tuna - 6oz~~ |
| 402B | 002 | 18765 | 4.10 | Value Coffee - 16oz |
| 402C | 003 | 16755 | 2.39 | Gem brownie mix |
| 402D | 004 | 28568 | 1.85 | Grind Flour - 5lb |
| 402E | 005 | 98583 | 2.65 | Super Pudding - 12 |

FIG. 4

| RecID | Product ID | Price | Product Description | RecActive | TransID | RecParent ID | RecParent Edit | RecParent Active |
|---|---|---|---|---|---|---|---|---|
| ~~001~~ | ~~12580~~ | ~~3.75~~ | ~~Superfish Tuna - 6oz~~ | ~~0~~ | ~~3~~ | ~~NULL~~ | ~~1~~ | ~~0~~ |
| 002 | 18765 | 4.10 | Value Coffee - 16oz | 1 | 3 | NULL | 1 | 1 |
| 003 | 16755 | 2.39 | Gem brownie mix | 1 | 3 | NULL | 1 | 1 |
| 004 | 28568 | 1.75 | Grind Flour - 5lb | 1 | 3 | NULL | 1 | 1 |
| 005 | 98583 | 2.65 | Super Pudding - 12 | 1 | 3 | NULL | 1 | 1 |
| 101 | 32586 | 2.20 | Mini Brownies - 12oz | 1 | 3 | NULL | 0 | NULL |

FIG. 5

| | 910A | 910B | 910C | 910D | 910E | 910F | 910G | 910H | 910I |
|---|---|---|---|---|---|---|---|---|---|
| | RecID | Product ID | Price | Product Description | RecActive | TransID | RecParent ID | RecParent Edit | RecParent Active |
| 902A | ~~001~~ | ~~12580~~ | ~~3.75~~ | ~~Superfish Tuna - 6oz~~ | ~~0~~ | ~~NULL~~ | ~~NULL~~ | ~~NULL~~ | ~~NULL~~ |
| 902B | 002 | 18765 | 4.10 | Value Coffee - 16oz | 1 | NULL | NULL | NULL | NULL |
| 902C | 003 | 16755 | 2.39 | Gem brownie mix | 1 | NULL | NULL | NULL | NULL |
| 902D | 004 | 28568 | 1.75 | Grind Flour - 5lb | 1 | NULL | NULL | NULL | NULL |
| 902E | 005 | 98583 | 2.65 | Super Pudding - 12 | 1 | NULL | NULL | NULL | NULL |
| 902F | 101 | 32586 | 2.20 | Mini Brownies - 12oz | 1 | NULL | NULL | NULL | NULL |
| 902G | 150 | 12580 NULL | 3.75 | Superfish Tuna - 6oz NULL | 1 | -3 | 001 | 1 | 1 |
| 902H | 151 | 18765 NULL | 4.50 | Value Coffee - 16oz NULL | 1 | -3 | 002 | 1 | 1 |
| 902I | 152 | 16755 NULL | 2.59 | Gem brownie mix NULL | 1 | -3 | 003 | 1 | 1 |

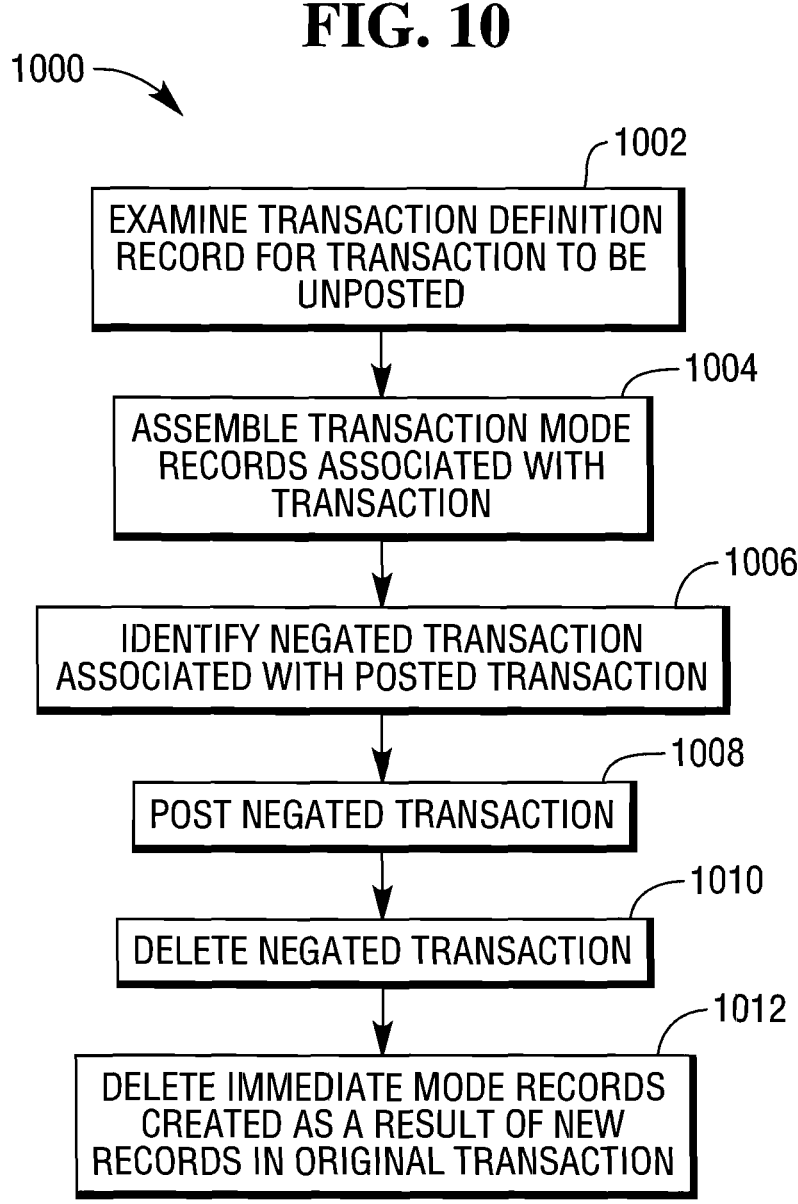

METHODS AND APPARATUS FOR MANAGING AND UPDATING STORED INFORMATION

FIELD OF THE INVENTION

The present invention relates generally to improvements relating to management of stored data. More particularly, the invention relates to improved systems and techniques for creating and storing additions and changes to previously stored data, transparently reviewing the data as it would be affected by the additions and changes, and reversibly applying the additions and changes when desired.

BACKGROUND OF THE INVENTION

Modern retailers, for example, modern chain supermarkets, maintain large amounts of price information. Frequently, price information for a large number of stores in different areas and regions is maintained in a central data repository accessible to many stores. Price information is updated frequently, and different price structures and additions and changes to those price structures may be implemented for different stores and regions. Price information may be relatively permanent, or may be temporary, being effective during clearly defined periods designated by start and end dates. Temporary prices may include, for example, price reductions for particular products due to weekly specials. Such temporary price information may be distributed or otherwise be made available to stores at specific locations or regions for use during the period in which they are effective, but it may not be desired to use such price information as permanent changes to a central database.

Large numbers of price changes may be performed at one time, or at designated times, and it would be convenient to be able to assemble a large number of changes and to enter the changes on command or according to a schedule. It would also be convenient to create and store the changes in a self contained way, so that an entry modifying a previously existing entry or representing a new entry does not, by virtue of its creation and storage, cause any change to the presently existing entry, or to its use. It would also be useful to be able to assemble presently existing entries, new entries, and entries representing changes to previous entries, in such a way that all the entries are accessible in a common repository, and to be able to see the effects of changes without actually implementing or committing the changes as a result of the procedures needed to see the their effects. It would further be convenient to be able to add temporary changes that would automatically expire without a need for further intervention. It would further be convenient to be able to maintain a record of changes to data stored in the database in order to review a history of the changes and to reverse the changes as desired.

SUMMARY OF THE INVENTION

According to one aspect, the present invention addresses such needs, as well as others, by maintaining changes to current data in a self contained form, allowing entry representing new or changed data to be constructed and added to the database without immediately affecting the current data in the database. Current data, and additions and changes to current data, are suitably stored in the form of database records, with records representing relatively permanent data stored in a central location, and records representing additions and changes to this relatively permanent data, suitably including indicia identifying them as relatively permanent records or as records representing additions and modifications, respectively. Each type of record also includes or is associated with appropriate indicia that can be used to control the performing of operations on the records, so that definitions, queries, and commands can easily be constructed to include and perform desired operations on each type of record.

Records representing relatively permanent data, suitably stored in and retrieved from a central repository, may be referred to as immediate mode records. Records other than immediate mode records, for example, records representing additions and changes to current data, and records representing data for temporary use, or data to be used in selected locations, may be referred to as transaction mode records. Transaction mode records are suitably treated in groups, conveniently referred to as transactions. The treatment of records included in a transaction may suitably be directed using a record known as a transaction definition record. Each transaction mode record includes an indicator pointing to the transaction definition record with which it is associated, and various indicia in the transaction definition record provide information useful for managing the treatment and use of the transaction mode records included in the transaction defined by the transaction definition record.

For example, a record defining a transaction may indicate a date when all the records making up the transaction are to be posted, that is, designated as relatively permanent data stored in the database. Alternatively, records associated with a transaction may represent temporary price changes, for example, weekly specials having start and end dates. The record defining the transaction will suitably include start and end dates indicating the period in which these prices are effective, and the records identified with the transaction will be used during their effective period.

Suitably, the immediate mode records and transaction mode records are constructed in such a way as to allow their storage in a common table in a relational database.

Each immediate mode record and transaction mode record includes a field identifying the record, and a field identifying the transaction definition record with which it is associated. An immediate mode record will have a suitable value, such as a null or zero value, in this field, and the presence of a value such as a null or zero value defines the record as an immediate mode record. A transaction mode record may modify an immediate mode record, or may represent a new entry to be added to the database. If a transaction mode record stores data to be used to modify an immediate mode record, the transaction mode record will include a field identifying the immediate mode record to be updated.

Transaction mode records and immediate mode records are constructed so that they may be stored together in the same table, and allow for the construction of database views that will show the effects of the implementation of transaction mode records without affecting the current data as implemented by the existing immediate mode records. Various combinations of commands may be implemented to transparently provide views of the effects of a transaction, or to use the transaction to create a data structure for export to one or more locations, typically for temporary use.

The data stored in a transaction mode records is converted to immediate mode by posting. Posting a new transaction mode record, that does not update a currently existing record, may be accomplished by creating a new immediate mode record and copying appropriate fields of the transaction mode record to corresponding fields of the immediate mode record. Posting a transaction mode record that modifies an immediate mode record is accomplished by updating appropriate fields in the corresponding immediate mode record. When a transaction mode record that modifies an immediate mode record is to be posted, a corresponding negated transaction mode record is created. This negated transaction mode record is a newly created transaction mode record, and preserves the originally existing data in order to allow for a reversal of the change, or simply to allow for viewing of the previously existing data if desired. The negated transaction mode record can be maintained in the same table as the other transaction mode records and the immediate mode records, because its presence will not affect the use of the immediate mode record. The negated transaction mode record can be used to reverse posting of the previous transaction mode record simply by using the negated transaction mode record to modify appropriate data in the corresponding immediate mode record. Suitably, posting of a transaction results in creation of a new transaction comprising negated transaction mode records and a transaction definition with which the negated transaction mode records are associated. A transaction can be unposted by posting the newly created transaction associating the negated transaction mode records, and deleting those immediate mode records associated with the posted transaction that represent additions of data.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates a section of a database table immediate mode records, as well as records associated with various transactions, according to an aspect of the present invention.

FIG. 3 illustrates a database table storing transaction definition records, according to an aspect of the present invention.

FIG. 4 illustrates a temporary price structure created according to an aspect of the present invention.

FIG. 5 illustrates a database view showing the effects of a transaction according to an aspect of the present invention.

FIG. 9 illustrates a section of a database after posting of a specified transaction, according to an aspect of the present invention.

FIG. 10 illustrates a process of unposting a transaction according to an aspect of the present invention.

DETAILED DESCRIPTION

Figure 1:
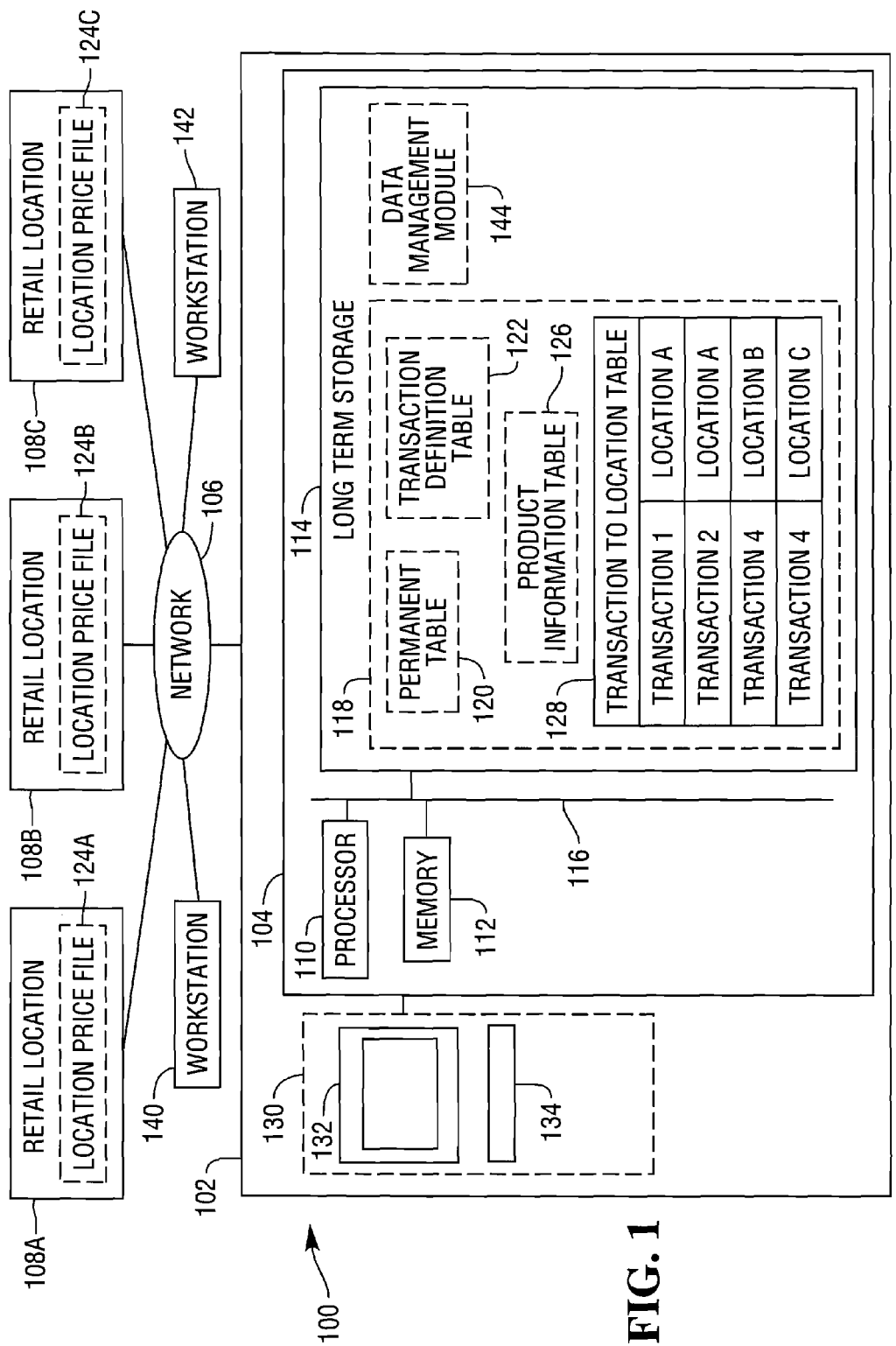
FIG. 1 illustrates a price management system according to an aspect of the present invention.

FIG. 1 illustrates a product information management system 100 according to an aspect of the present invention. The information management system 100 may suitably be used, for example, by a supermarket chain, and in one exemplary embodiment may include a central data storage facility 102, suitably including a data server 104 accessible through a network 106 from a plurality of remote locations 108A-108C. The network may suitably comprise a combination of local area and wide area networks, using appropriate measures for authentication and security of data. If desired, and if compatible with desired speed and security of communication, the network 106 may suitably employ the public Internet to facilitate communication. The locations 108A-108C are suitably retail supermarket locations belonging to the same supermarket chain, and may be in different regions implementing different price structures for products.

The data server 104 may be implemented as a single unit, or a complex of coordinated units, as needed to provide data services to the locations 108A-108C. Alternatively, the locations 108A-108C may maintain data using their own individual facilities, with information being coordinated between locations in any way desired. Any number of additional ways of managing data and coordinating data between locations may be employed.

For the sake of simplicity, only the three locations 108A-108C are illustrated here, but it will be recognized that a system similar to the system 100 may be employed by chains consisting of hundreds or thousands of locations.

The server 104 may suitably include a processor 110, short term memory 112, and long term storage 114, communicating over a bus 116. The server 104 may suitably host a product information database 118, storing product information for use by the locations 108A-108C. The product information database 118 may suitably include product identification information that may include product description information and price information for each product. The product identification information may, for example, include a product identification code, and may also include descriptive information such quantity and brand information.

Price information is particularly variable, because prices change constantly due to numerous factors, such as seasonal price variations, vendor price increases or decreases, specials and promotions, and other factors. In order to accommodate such price changes, and to provide for orderly assembly and implementation of updated price information in the database 118, the database 118 is structured so that updates to database records can be created and stored in the database 118 without being immediately implemented. The updates can be transparently imposed on existing records, so that the content of the database 118 as modified by the updates can be seen. However, until the updates are designated as relatively permanent data, the updates may appear as essentially transparent insofar as they affect or supplement the relatively permanent data stored in the database 118. In addition, posting of updates is suitably performed in such a way as to preserve a record of the current information existing before the update. In addition, after the updates have been used to modify or supplement the relatively permanent data, the records reflecting the updates may be maintained as originally created, in order to allow for preservation of a history of updates that have been made.

Suitably, the database 118 comprises a plurality of tables, including a central data table 120, and additional tables used with the table 120 and providing for convenient references to additional information relating to elements stored in the table 120. The central data table 120 may suitably store a plurality of immediate mode and transaction mode records, with the immediate mode records representing relatively permanent data and the transaction mode records representing new data, modifications to relatively permanent data, temporary data, or data that for one reason or another has not yet been or is not intended to be stored for use in relatively permanent form in the table 120.

The database 120 also suitably includes a transaction definition table 122, storing transaction definition records for each transaction to be defined. A transaction definition record is suitably constructed when a transaction is initiated, and is maintained so long as the records associated with the transaction continue to be in transaction mode. When a transaction is posted, that is, when all the records associated with the transaction are converted to immediate mode records, or if the transaction represents temporary changes that have expired, the transaction definition record may be deleted from the table 122. Depending on the particular implementation of the system 100, however numerous alternatives are possible. It may be desired to retain transaction mode records in order to preserve a record of changes, in which case it would not be necessary to delete the transaction definition record associated with the transaction.

A transaction definition record suitably includes values indicating the use of the transaction mode records associated with the transaction. For example, a transaction may have a specified posting date, and this date may be stored in the transaction definition record. Alternatively, a transaction may have starting and ending dates indicating when prices stored in transaction mode records associated with the transaction are to be effective, and these dates may be stored in the transaction definition record.

Immediate mode and transaction mode records may suitably include indicia indicating whether they are immediate mode records or transaction mode records, and transaction mode records may suitably include indicia associating them with transactions and with particular immediate mode records. In particular, each immediate mode record and transaction mode record may include a field whose value identifies it as an immediate mode or a transaction mode record and, in the case of transaction mode records, associates it with a particular transaction. In addition, a transaction mode record that modifies an immediate mode record includes a field whose value associates it with the immediate mode record that it modifies, with the presence of specified values, for example null values, indicating that the transaction mode record does not modify an existing immediate mode record. For example, a transaction mode record including new data to be added to the database, would not include a value associating it with an existing immediate mode record.

All transaction mode records may be stored in a common table with immediate mode records. It will be recognized that data storage may be accomplished in many different ways, for example, by using tables dedicated to various types of data. Tables are typically used for data having similar properties. The use of a table allows for convenient treatment of data elements belonging to a similar data group. For example, in the case of a supermarket, data related to meats might be stored in one table and data related to paper products might be stored in another table. In the present exemplary case, however, for the sake of simplicity, a single table is used all transaction mode records and immediate mode records may be commonly stored in the table 120. However, the addition of transaction mode records to the table 120 will not cause an immediate modification or changes in use of the immediate mode records stored in the table 120. The transaction mode records may be retrieved, and various operations may be performed to show the effects of posting the records may be seen as desired, but the immediate mode data stored in the table 120 will remain unaffected until appropriate events have occurred.

One suitable use of the system 100 includes cases in which each of the locations 108A-108C uses its own pricing structure, and some transactions may be constructed to implement price structures specific to one or more of the locations 108A-108C, but not shared by all of the locations. In the present exemplary embodiment, the locations 108A-108C maintain location price files 124A-124C, respectively. Associations may be created between various transactions and groupings of one or more of the locations 108A, 108B, and 108C, and price structures may be created by using the transaction associated with a location or group of locations to assemble the transaction mode records associated with the transactions and use these transaction mode records, as well as immediate mode records and transaction mode records that are associated with all locations, either explicitly or by default, and create price structures appropriate to the locations. This use of transaction mode records can be performed even if some or all of the transactions being used to create a price structure for a location have not been, or are not intended to be, posted. That is, transaction mode records associated with particular transactions may be given effect at a particular location, or at a number of locations, even if the transaction mode records associated with the transaction are not intended to be converted to immediate mode records.

In one use of a system such as the system 100, appropriate price structures for the locations 108A-108C may be periodically assembled using the records stored in the table 120 and transmitted to or retrieved by the locations 108A-108C. The price structures thus created may be used to create the location price files 124A-124C. The use of transaction mode records in a price structure for a location or group of locations may be referred to as applying the transaction mode records, or as applying the transaction with which they are associated. Applying a transaction is different from posting the transaction, because posting the transaction results in the creation of a set of modified or new immediate mode records stored in the permanent table 120, while applying a transaction selects the transaction mode records associated with the transaction and uses them in a price structure for use as one of the location price files 124A-124C. One or more transactions may, for example, create temporary prices and may include beginning and ending effective dates. Transaction mode records associated with the transactions may be selected and used during the effective periods of the transactions, and may be used during that period in creation of any price file in which their information is used.

For example, suppose that a transaction is to be effective at location. A, for a period of one week, and that a price structure for location A is created daily and transmitted to location A for use as the location price file 124A. One exemplary transaction mode record associated with the transaction provides for a special price for a package of Giant Cleanser, modifying the regular price, which is stored as an immediate mode record in the permanent table 120. Each day, operations are performed on the table 120 to create a price structure for location A. Each day that the transaction including the special price for Giant Cleanser is effective, the transaction is applied. That is, the transaction mode records associated with the transaction are used to modify associated immediate mode record, and any new transaction mode records are used in the price structure. In the specific example used, the transaction includes the special price for Giant Cleanser, and the result of the modification, together with modifications and additions produced by other transaction mode records associated with the transaction, are used to create the price structure that is transmitted to the location A for use as the location price file 124A. Each day, the previous location price file 124A is discarded, and a new version of the location price file 124A is used.

The database 118 is suitably a relational database with information being stored in multiple tables related by appropriate fields appearing in multiple tables. As noted above, transaction mode records stored in the central data table 120 include a field identifying a transaction with which they are associated, and records defining transactions appear in the transaction definition table 122. In addition, product identification information stored in records in the table 120 may include product identification numbers serving as an index to product information in a product information table 126. The product information table may, for example, correlate each product identification number with a set of additional product information, such as descriptive and manufacturer information. Such techniques are well known in the art, and serve to avoid repetition of information by avoiding the necessity of repeating an entire set of data, such as product data, and instead substituting a reference to a table location storing the information.

One particularly convenient use of multiple tables is to use a separate table associating transactions with the regions or locations with which they are associated, for example, one or more of the locations 108A, 108B, and 108C. The table 128 is an exemplary transaction to location table, correlating transactions to locations to which they apply. The table 128 provides a convenient repository of data usable by creating instructions specifying appropriate search criteria, for example, searching the table 128 for transactions associated with particular locations, or using the table 128 to determine the location or locations associated with a particular transaction. In turn, appropriate queries and other operations may be performed on the table 120 in order to identify and retrieve transaction mode records associated with a particular location or group of locations, in order to assemble a price structure to be transmitted to the location. For example, suppose that it is desired to create a price structure for location A. Table 128 indicates that transaction 1 is associated with location A, so the transaction mode records associated with transaction 1 will be used to create the price structure. The table 120 may be searched for transaction mode records associated with transaction 1, and these records may be assembled. The assembled transaction mode records refer to a transaction definition record stored in the table 122, and this transaction information is used to provide information relating to the use of the associated transaction mode records. For example, the transaction definition for transaction 1 may provide for start and end dates, so that the transaction mode records may be used to provide price information as part of a price structure to be transmitted to location A during their effective dates.

The data server 104 is accessible through a user interface 130, including, for example, a monitor 132 and keyboard 134, allowing a user to perform desired operations on the database 118, such as creating and editing immediate mode and transaction mode records, defining queries, and other appropriate operations. The user interface 130 is exemplary, and numerous additional and alternative means of performing operations on the database 118 may be employed. For example access may be provided through a remote terminal or construction of automatic procedures for constructing records and defining queries. In addition, one or more user workstations such as the workstations 140 and 142 may be used to allow access to the database 118, in order to provide for creation of updates to the database 118 and examination of and operations on data stored in the database 118.

Suitably, the data server 104 hosts a data management module 144, allowing users to make updates and changes to the database 118, and to perform operations using the database 118, such as viewing the effects of transactions on the database 118. The data management module 144 suitably allows changes to database records in one of two modes, referred to here as immediate mode and transaction mode. In immediate mode, suitably performed in order to directly change immediate mode records, a change to the database 118 is made effective as soon as the change is made to a record. In transaction mode, the data management module 144 is used to create and update transactions, that is, to create groups of transaction mode records associated with transactions, along with desired designations governing the use of the information stored in the records.

In particular, the data management module 144 allows for construction of transactions over multiple sessions, and by a number of different users, if desired, while providing appropriate controls so that a user works on only one transaction at a time. The data management module 144 may present a display interface, for example, providing various menus allowing a user to initiate transactions, and open and close transactions. All transaction mode records created when a transaction is open will include a transaction identifier referring to the transaction. The transaction identifier may be automatically created when a transaction is initiated. For example, initiation of a transaction may cause the creation of a transaction definition record with an automatically generated identifier, and filler information in fields controlling operations to be performed on records associated with the transaction. Transaction mode records created while the transaction is open will each include a field storing a value referring to an identifier for the transaction definition record. Suitably, a transaction may be opened and closed as desired by any number of users, for example through appropriate menu selections, allowing the transaction to be worked on in stages by different users, if desired, with controls provided so that each user is working on the desired transaction. Transaction mode records and a transaction definition record associated with a transaction, may be stored in the tables 120 and 122, respectively, while the transaction is being worked on, or alternatively may be stored in a separate location and moved to the tables 120 and 122 once the transaction reaches a stage when it is desired to begin performing operations on the transaction. These operations may include views and queries performed on the transaction as part of testing, or may include use of the transaction as a source of data.

Transaction mode records suitably include new records and records that modify existing immediate mode records. Each transaction record suitably includes an individual identifier, and a value referring to an identifier of the particular transaction with which it is associated. A transaction mode record that modifies an existing immediate mode record suitably includes a value referring to an identifier of the immediate mode record, with immediate mode records and new transaction mode records using a null value as the reference. The use of appropriate indicia in a transaction mode record allows it to be stored in a self contained way, with transaction mode records being able to be stored in the database 118 without affecting immediate mode records until desired. In addition, multiple transaction mode records may be stored in the database 118 in order to store different values for the same data, such as different prices for the same product. Associating each of these transaction mode records with a specific transaction allows different pricing to be implemented as and when desired, according to information provided by the transaction definition records of the different transactions. One suitable structure of a set of immediate mode and transaction mode records, showing the indicia present in the various records, and the relationships between different records and between transaction mode records and transactions, is discussed below.

FIG. 2 illustrates a selection 200 of records, similar to those that may appear in the permanent table 120. The selection 200 includes a plurality of product and pricing records. As an example, some of the records are immediate mode records, and some of the records are transaction mode records. The transaction mode records are assembled into groups corresponding to different transactions with which they are associated. For convenience, the selection 200 is presented in such a way that records that are associated with the same transaction appear together, but it will be recognized that a database table may be sorted in any number of ways, and that transaction mode records appearing in a table and associated with a particular transaction may be identified and retrieved as desired, no matter how the table happens to be sorted at any particular time.

In the present example, the records 202A-202E are immediate mode records and the records 202F-202M are transaction mode records. The immediate mode records 202A-202E are records that are intended to represent relatively permanent information, and the transaction mode records are records that are stored in a "pending" state, awaiting some operation or combination of operations, depending on the transaction with which they are associated. Transaction mode records may represent added records that provide information not reflected by existing immediate mode records. Transaction mode records may also modify presently existing immediate mode records, for example, by providing updated price information or by deleting the immediate mode records. One use of a transaction and its corresponding transaction mode records is to assemble records for posting upon the occurrence of a particular event, such as the arrival of a specified date or the execution of a command to post the transaction. The transaction and its associated data may be retrieved and examined in different ways before posting, in order to make sure that the data is as desired. Another use of a transaction is in assembling price data for use in ways other than relatively permanent and centralized storage. Typically, such use involves price modifications for temporary or localized use, or both. A permanent modification to be used in all locations, or a permanent addition of information for a product, is typically more suitably posted to the central database for storage in relatively permanent form. Price modifications, especially temporary price modifications, may often be desired to be used during their effective dates and allowed to effectively lapse after the effective dates have expired. Therefore, a transaction may be defined that provides for a period of effectiveness for a set of price modifications. Such a transaction may be associated with a particular location or set of locations by a reference in the table 128, or may be effective for all locations. The absence of a reference to specific locations in the table 128 may serve to indicate that a transaction is effective for all locations.

In the present example, the records 202F-202I are associated with Transaction 1, and the records 202J-202M are associated with Transaction 3. Transaction 1, as will be discussed further below, modifies associated ones of the records 202A-202E in order to create a price structure for transmission to the location A. Transaction 3 represents a set of records that have been assembled for posting to the table 120, that is, for updating, adding or deletion of immediate mode records, as of the posting date for Transaction 3.

The selection 200 includes columns 210A-210I, with each column comprising fields for each record. Each field includes appropriate values. The various types of data that are included in fields may include substantive data relating to products, such as product identification and pricing data. Another type of data may include data characterizing a field as a particular type and typically addressed by search functions or otherwise used to control actions to be taken with the record. Still another type of data includes a field associating a record with another associated record.

Columns 210B, 210C and 210D include product identification and pricing data. Specifically, the column 210B includes a product identifier for each of the records 202A-202M, the column 210C includes a price value for each of the records 202A-202M, and the column 210D includes a product description for each of the records 202A-202M. If desired, the column 210D may be absent from the selection 200, with the product identifier value in the column 210B serving as an index to the table 126. The table 126 may include additional product information as desired. However, for ease of viewing in the present illustration, the product description information is explicitly stated in each record.

A transaction mode record frequently only modifies selected fields of an associated immediate mode record, and seldom modifies every field. Substantive data fields of a transaction mode record may suitably take on a null value when those fields do not modify corresponding fields of an immediate mode record. Therefore, for the records 202F-202I and 202K-202M, the Product ID field and the product description field are given a null value. In the present illustration, for the convenience of the reader, the fields are shown with both the word NULL and a value corresponding to the value stored in the record being edited. However, the non-null value typically will not be present in an actual implementation.

The column 210A includes a unique record identifier for each of the records 202A-202M. This field is called the RecID field, with "Rec" being short for "Record". The labels of the fields are chosen for the convenience of the user, and tables may be designed, and labels chosen, as desired. Each immediate mode record and transaction mode record includes a record identifier in the appropriate location in column 210A. In addition, each of the records 202A-202M includes various fields indicating the status and function of the record. These fields may serve as flags, suitably taking a limited number of alternative values, such as a 1 or a 0, or a null, 1, or 0. Other fields may take on a null value to indicate one function for the record, or an alternative value, such as a value serving as an index value, to indicate another function for the record.

For example, consider the record 202A. The record 202A is an immediate mode record. The record 202A includes a RecActive field at column 210E, which serves as a flag indicating whether the record is still implemented in the system, and controlling whether the record is available for use. In the record 202A, the RecActive field has a value of 1, indicating that the record is active and is to be used as a source of price information. In order to allow for easier tracking of changes, may be convenient not simply to delete a record if it becomes superfluous, but instead to set a value rendering it inactive. Thus, if the product whose information is provided by the record 202A is no longer carried at a retailer location, the record 202A can be removed from use by setting the value of RecActive to 0. In this way, the information provided by the record 202A is preserved, and can easily be restored to use in case it was erroneously removed. In addition, the historical information provided by the record is preserved, even though the information is not used for pricing. If desired, the value of RecActive may be set to 0 directly, in which case the affected record will be immediately excluded from use. Such a change may be made for immediate mode records or for transaction mode records.

It is also possible to exclude an immediate mode record from a particular use, or from general use, by creating an appropriate transaction mode record referring to the immediate mode record. This procedure is discussed in additional detail below.

The field TransID, in the column 210F, is used to identify a transaction with which the record is associated. An immediate mode record is not associated with a transaction, and the TransID field for such a record, such as the record 210A, takes on a value indicating that the record is not a transaction mode record, such as a null or 0 value. If the record is a transaction mode record, such as the records 202FG-202M, the value of TransIID takes on the value of the transaction with which the record is associated. Thus, for the records 202F-202I, the value of TransID takes on an integer value of 1, and for the records 202J-202M, the value of TransID takes on an integer value of 3.

The field RecParentID, in the column 210G, ties a transaction mode record to an mediate mode record that it modifies. If a transaction mode record modifies an immediate mode record, the value of the field RecID of the immediate mode record is stored as the value of RecParentID in the transaction mode record. In immediate mode records, such as the record 202A, the value of RecParentID is a null value. In transaction mode records that add new data and do not modify existing data, such as the record 202J, the value of RecParentID is also a null value.

The record 202F is an example of a transaction mode record that modifies an immediate mode record. The value of RecParentID in the record 202F is 001, indicating that the record 202F modifies the record 202A.

An additional field is RecParentEdit, in the column 210H, indicating whether or not a record is a transaction edit storing data to be used to modify an existing immediate mode record. Immediate mode records and records representing new data have a null value in this field, while records editing immediate mode records have a value of 1. Such records are typically automatically deleted when their corresponding immediate mode records are deleted. In some cases, however, a transaction mode record may be created as a new record and then associated with an immediate mode record. The value of RecParentEdit for such a record is 0, and it will not be automatically deleted when the corresponding immediate mode record is deleted.

Still another field is RecParentActive, in the column 210I. The value of this field serves as an indication as to whether or not a record has an associated immediate mode record that is currently active. For an immediate mode record, the value of this field is a null value, and for a transaction mode record that modifies an associated immediate mode record, the value defaults to 1. When an immediate mode record that is the parent of a transaction mode record is deleted directly, the value of RecParentActive for all transaction mode records for which the deleted immediate mode record is the parent are set to 0.

In addition, as noted above, it may be desired to implement a transaction that excludes a particular immediate mode record from use. Another possibility is to create a transaction that effectively deletes one or more immediate mode. For example, it may be desired to create a price structure which excludes a selected immediate mode record. A transaction mode record may be created in order to accomplish this goal. This transaction mode includes a value of RecParentID referring to the immediate mode record that it is desired to exclude. The transaction mode record includes a value of 0 for RecParentActive. When the transaction mode record is applied, the immediate mode record referred to in the RecParentID field will be excluded. An example of a transaction mode record created for this purpose is the record 202F, which is associated with transaction 1.

It may also be desired to create a transaction mode record that may eventually be posted, and whose posting will have the effect of deleting, or rendering inactive, an associated immediate mode record. An example of such a transaction mode record is the record 202K, which is associated with transaction 3. The value of RecParentID for the record 202K is 0, and when this record is posted, this value will be examined and will result in setting of the value of the RecActive field of the immediate mode record associated with the transaction mode record, namely, the RecActive field of the record 202A, to 0.

FIG. 3 illustrates a transaction definition table 300, providing information relating to transactions 1-5. Data for use in transactions 1 and 3 is illustrated in FIG. 2, but transactions 2, 4, and 5 provide information showing various treatments of data. The transaction definitions comprise records 302A-302E, with each transaction definition record including values in columns 304A-304F. The column 304A comprises an identifier for each transaction definition record, given the name TransID. This value appears in the TransID field in each transaction mode record in FIG. 2, and is used to associate each transaction mode record with a transaction. Each of the records 302A-302E also suitably includes an entry date field, appearing in the column 304B, showing a creation date for the record. In addition, each record suitably includes a posting date field, appearing in the column 304C, showing a scheduled posting date for the transaction. For transactions that are not to be posted, this field has a null value. Each record also suitably includes start date and end date fields, appearing in column 304D and 304E, respectively, showing when information associated with the transaction is to be effective. These values are particularly useful for temporary price modifications used in creating price structures for use in various locations, but not to be stored as relatively permanent data in a central location. Each record also suitably includes a sequence indicator, indicating the relative sequence in which transactions are to be acted on. This information is useful when time periods for transactions overlap because if two transactions change the same field of the same item, the value in the last applied transaction is the value that will remain. Transaction 1 and transaction 4 are effective in the same time period, and the sequence information indicates that in any operation in which there might be a time conflict, for example, if operations are to be performed on each day of the time period, transaction 1 is to be operated on before transaction 4. The effect of this sequencing, in a case where daily operations were performed, is that on each day of the period, transaction 1 would be operated on before transaction 4. In addition, transaction 3 is to be posted on the same day as the last date on which transaction 2 is effective, indicating that if an operation is scheduled on transaction 2 on that day, that operation will be performed before the posting of transaction 3.

Numerous other fields are possible, providing any additional desired details convenient for identifying or providing insight into the nature of the transaction. As an example, the transaction definition table 300 includes the columns 304G and 304H, providing name and description formation for the transactions. The name and description information provides additional human readable information for each transaction, and can also be used in queries.

A user can easily retrieve immediate mode and transaction mode records, and can also perform operations showing the effects of transactions. This is accomplished by constructing appropriate queries and performing resulting views of the database 118. Queries may suitably be constructed using structured query language, which define records to be retrieved, and may consult various tables, such as the table 120, 122, 126, and 128, to identify correspondences between records.

FIG. 4 illustrates a view 400 resulting from an operation performed on the database 118 to use transaction 1 on the data shown in the selection 200 of the table 120 in order to create a price structure for transmission to location A. The operation collects the transaction mode records associated with the transaction, uses them to modify associated immediate mode records, collects any unmodified immediate mode records, and compiles this information into a price structure. The view shows the records 402A-402E, which correspond to the records 202A-202D as modified by the records 202F-202I, and the record 202E, unmodified. The record 402A has been excluded from the view, and this exclusion is shown in the present illustration by placing strikethroughs over the values stored in the fields of the record. Exclusion may also be accomplished simply by suppressing the appearance of the record in a view such as the view 400. The records 402B-402D show changes corresponding to the records 202G-202I, and the record 402E simply presents the values shown in the record 202E.

The view also illustrates columns 404A-404D, which include fields for the record identifier, the product identifier, the price, and the product description, respectively. The view 400 may be created by appropriate table operations, suitably by consulting the table 128 to identify the transaction associated with location A, that is, transaction 1, consulting the effective dates for the transaction, identifying the date range as matching the current date, and constructing a definition including the transaction mode records associated with transaction 1, together with all immediate mode records. A self join may then be performed on the table to return the records meeting that definition, and nonsubstantive data stripped out of the records. That is, data relating records to one another and indicating whether a record is an immediate mode record or a transaction mode record may be removed as irrelevant to creating the price structure, leaving only the substantive data. The data may be properly formatted and transmitted to the location A for use.

The effects of a transaction may be seen by performing desired operations, such as constructing and executing database queries, and constructing table joins and database views. These operations can allow users to see how the transaction mode records associated with a transaction supplement and affect immediate mode records, thereby allowing a user to see a price structure provided by the transaction. The effects of a transaction can be viewed transparently, without any effect on immediate mode records.

FIG. 5 illustrates a view 500 showing the effects of transaction 3 on the existing immediate mode records shown in the table section 200 of FIG. 2, and the price structure that would be created by posting the transaction. The view 500 shows the effect of a combination of the transaction mode records associated with transaction 3, that is, the records 202J-202M, with the immediate mode records 202A-202E. The record 202J is a new record, and its information appears in the view 500 as the record 502F. The record 202K has a value of 0 for the RecParentActive field, indicating that the associated immediate mode record, that is, the record 202A, is to be effectively deleted. The resulting record in the view 500 is the record 502A. In order to show the effects of the transaction, the record 502A suitably appears, so that it can be seen that the record 202A was present and was operated on. Suitably, in addition to including the changed value for the RecID field, the presentation of the record 502A may differ from that of the others, for example, by showing the record 502A in a different font. In the example here, the record 502A is shown with strikethroughs, to indicate that a deletion has occurred. Posting of the record 202K would result in the effective deletion of the immediate mode record 202A, suitably by changing the value of the RecActive field to 0 in the record 202A. Care should be exercised in creating and posting transactions that include deletion of immediate mode records, because such deletion would make the immediate mode record unavailable for use by other transactions that might refer to it.

The records 202L and 202M change price values for the records 202B and 202C of FIG. 2, and their effects appear as the records 502B and 502C. The records 502A-502F include the columns 504A-504I, including substantive data and various values serving as flags and references. Suitably, the transaction identifier appears in the column 504F, to allow a user to easily see which transaction is being worked on. The value of RecParentID, in the column 504H, may take on a null value, and the values of RecParentEdit and RecParentActive, in the columns 504J and 504I, may take on appropriate values to help provide a reminder of the operation being performed on each record.

Figure 6:
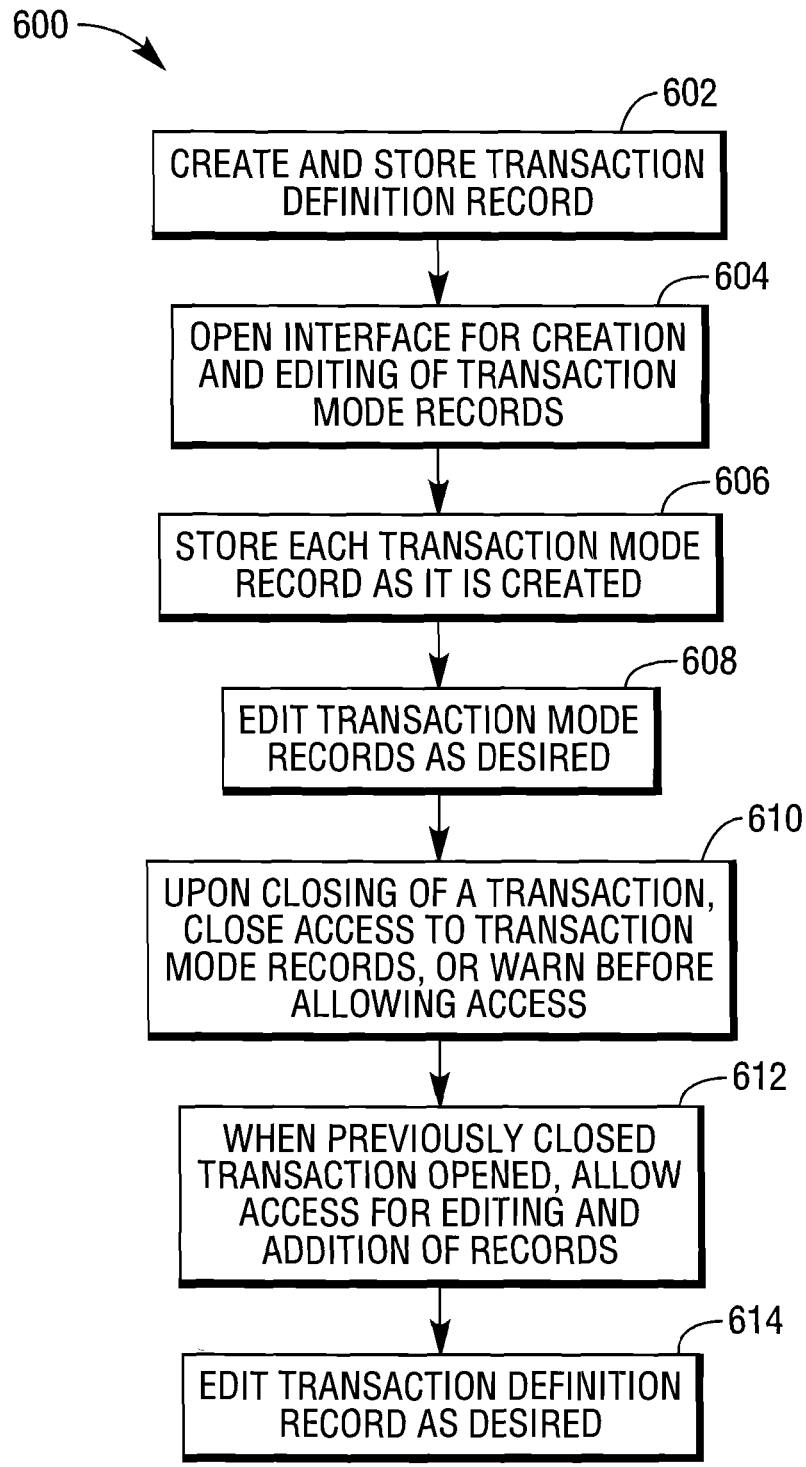
FIG. 6 illustrates the steps of a process of creating a transaction according to an aspect of the present invention.

FIG. 6 illustrates the steps of a process 600 for creation of a transaction. The process 600 may suitably be performed using a system such as the system 100, to provide price structures used with such a system.

Suitably, the transaction comprises a set of associated transaction mode records structured in a similar way to those described above with respect to FIG. 2, and including specific features to insure compatibility with immediate mode records, the ability to tie transaction mode records to immediate mode records, and the ability to distinguish between transaction mode records and immediate mode records and to associate transaction mode records with a particular transaction.

Features insuring compatibility with immediate mode records may suitably include the presence of similar fields, and transaction mode and immediate mode records may be distinguished by the presence or absence of distinctive values in specified fields. For example, the TransID field illustrated in FIG. 200 may be present in both immediate mode and transaction mode records, but take on a null or 0 value for immediate mode records. Similarly, features tying transaction mode to immediate mode records may include fields in transaction mode records referring to associated fields in immediate mode record, for example, the RecParentID field, which in many cases has as a value of the RecID field of immediate mode records that are to be updated. Examples of features allowing the identification of transaction mode records of interest may include fields including data identifying information to which the record relates, such as a product identifier field. The presence of such fields allows for the identification and retrieval of fields relating to information of interest.

At step 602, a definition for transaction made records is created. The definition includes specifications of structural elements that insure compatibility with a table in which the transaction mode record will be used. For example, in the case of the selection 200, each transaction mode record that modifies an immediate mode record will contain values for the fields defined in the columns 210A-210I. The specification includes default values for specified fields, such as table defaults. For a transaction mode record, all fields of the transaction mode record are suitably initially null values, other than various fields needed to identify the record.

For new immediate mode records, or for transaction mode records representing new data, a predefined source for default values may be used. For example, a predefined record may be stored, with values for this record copied to new immediate mode records for use as defaults. For example, a transaction with a very high identifier value may be created, with one transaction mode record belonging to that transaction. This transaction mode record includes values that may suitably be copied to new records to initialize. For example, if an immediate mode record stores pricing information in one or more fields, these fields should be initialized with non-null values for the pricing information. Pricing information may include, for example, actual price, minimum and maximum price, and discount. Default values for these fields may be taken from a predefined record.

A transaction mode record will take on the default values for fields in which a specified default value exists, unless the record should take on a different value. In the exemplary selection 200, the default values are "1" for the RecActive field, "0" for the RecParentEdit field, and "1" for the RecParentActive field.

At step 602, upon initial opening of a transaction, a transaction definition record is created and stored. The transaction definition record suitably includes an automatically generated transaction identifier, and is suitably stored in a transaction definition table. At step 604, an interface is opened allowing a user to create and edit transaction mode records. Each transaction mode record created in a particular transaction is suitably automatically furnished with an appropriate value identifying the transaction with which it is associated, for example, the value of the TransID field.

At step 606, as each transaction mode record is created by a user, the transaction mode record is stored, suitably in a common database table with other transaction mode records associated with other transactions and with immediate mode records. At step 608, transaction mode records associated with the transaction are edited as desired by a user. At step 610, upon closing of a transaction, access to the transaction mode records associated with the transaction is suspended until the transaction is reopened. Alternatively, access may be allowed but with an appropriate warning to confirm that the record to which access is being sought is the record desired. At step 612, whenever a previously closed transaction is opened, access to transaction mode records associated with the transaction is allowed for editing of existing transaction mode records and addition of new transaction mode records by a user. Suitably, the same transaction may be opened by any number of users and work performed on the transaction at the same time, with transaction mode records being stored in a suitable repository. At step 614, the transaction definition record is edited whenever desired by a user.

Figure 7:
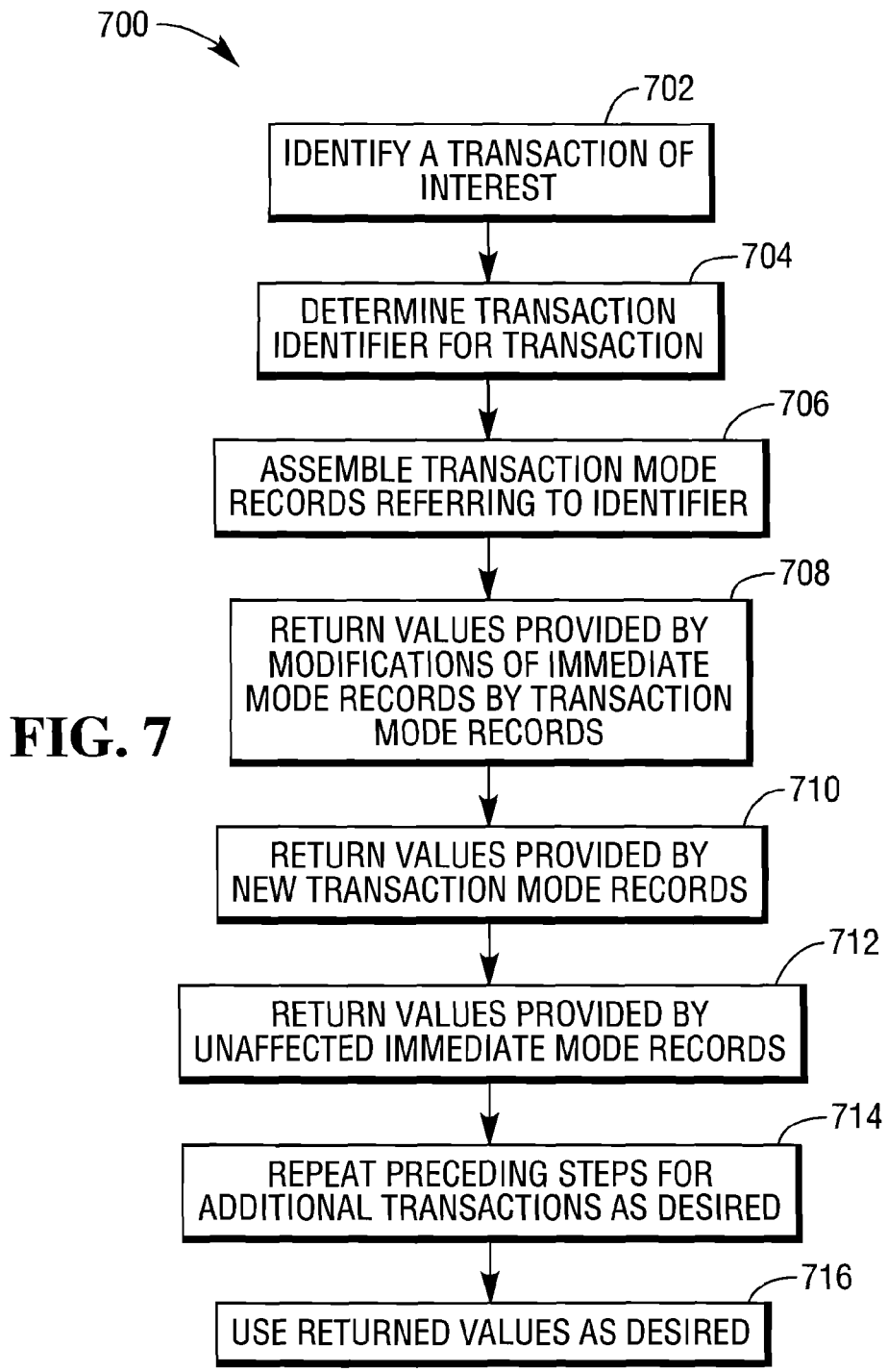
FIG. 7 illustrates the steps of a process of managing and viewing transactions, and using transactions to create temporary price structures, according to an aspect of the present invention.

FIG. 7 illustrates the steps of a process 700 for managing transactions, viewing the effects of transactions, and using transactions to create price structures for use without posting the transactions. The process 700 may be used for one transaction, or for a number of transactions to be viewed or otherwise used.

At step 702, a transaction of interest is identified. This may be, for example, a transaction that is desired to be examined and tested, whether the transaction is under construction, has been tentatively completed, or is in active use. Another example is a transaction that is to be used to assemble a price structure for export. Identification may be performed by explicit selection, for example. As another exemplary alternative, identification may be performed by identifying transactions meeting specified criteria, such as by consulting a transaction to location table to identify transactions to be used to create temporary price structures for specified locations, or by consulting a transaction definition table to identify transactions scheduled to be posted on specified dates.

At step 704, the transaction definition record for the transaction is examined to determine the transaction identifier. At step 706, transaction mode records referring to the transaction identifier are assembled. At step 708, appropriate operations are performed to return values provided by transaction mode records as they modify immediate mode records. For example, if a transaction mode record edits an immediate mode record, a reference to the immediate mode record may be used to retrieve the immediate mode record. The transaction mode record and the immediate mode record may be merged, with non-null values in the transaction mode record overwriting corresponding values in the immediate mode record. At step 710, operations may be performed to return values for new transaction mode records, assembling such records and making available for temporary use the values stored in these records. At step 712, unmodified immediate mode records are assembled and made available. At step 714, the preceding steps are repeated for as many additional transactions as are desired to be treated together.

At step 716, the returned values are used as desired. For example, the returned values may be displayed to show a price structure provided by the transaction, or may be assembled to create a price structure for transmission to a location or to a combination of locations.

Figure 8:
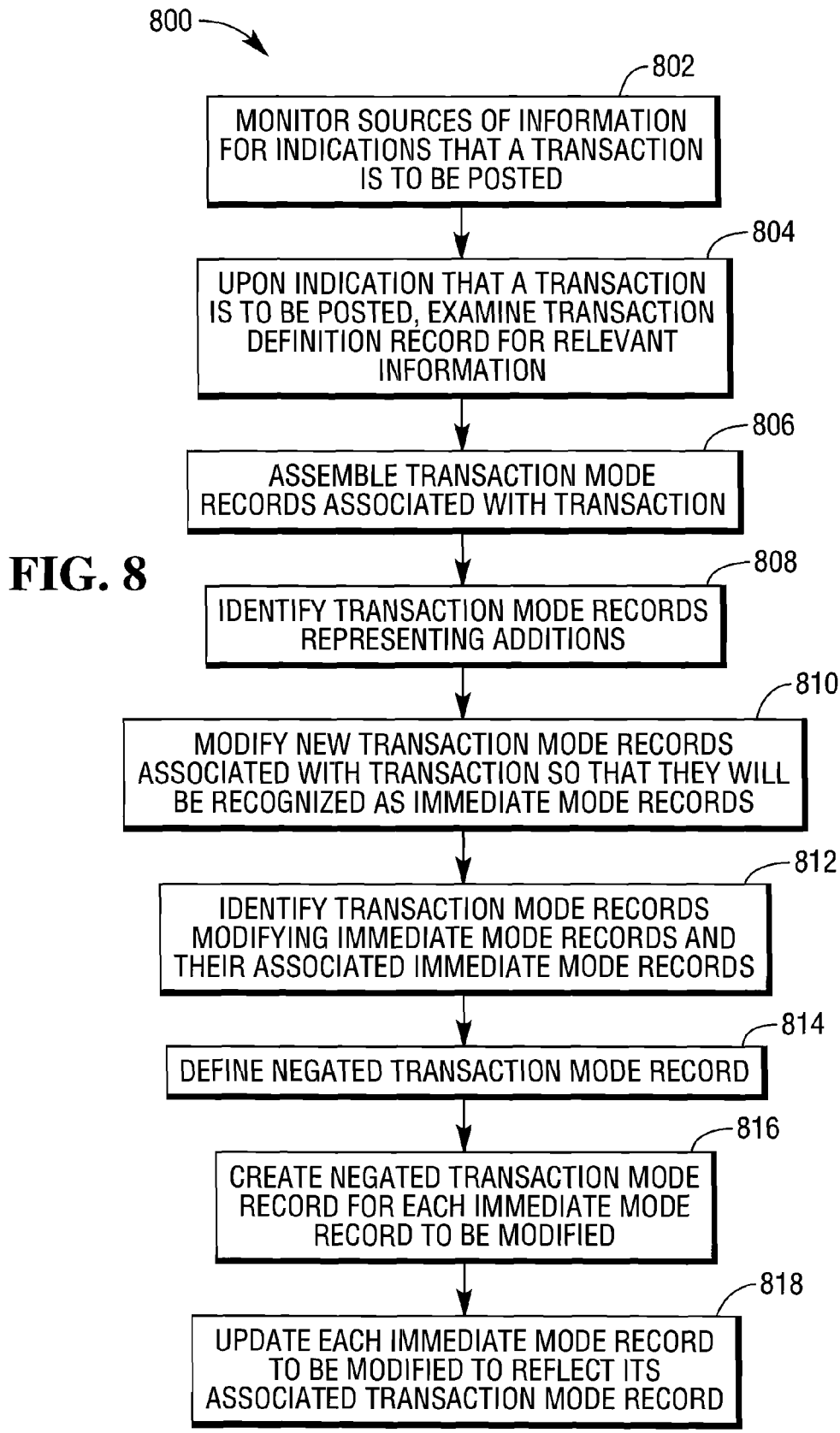
FIG. 8 illustrates the steps of a process of posting transactions according to an aspect of the present invention.

FIG. 8 illustrates the steps of a process 800 of posting transactions, according to an aspect of the present invention. Posting of a transaction is the conversion of a transaction mode records associated with the transaction to immediate mode records. Posting of a transaction may be performed as a result of an explicit selection, or may be performed automatically as a result of the occurrence of a specified event, such as the arrival of a scheduled posting date, for example.

At step 802, various sources of information are monitored for indications that a transaction is to be posted. The sources of information may suitably include user inputs, such as user inputs selecting posting of transactions. Other sources of information may include a transaction definition table, if this table includes indicia, such as scheduled posting dates, indicating when transactions are to be posted.

At step 804, upon an indication that a transaction is to be posted, a transaction definition record for the transaction is examined and relevant information is retrieved from the transaction definition record. Such information may include, for example, a transaction identifier. At step 806, transaction mode records associated with the transaction are retrieved.

At step 808, transaction mode records representing added records are identified. This identification may be accomplished, for example, by examining a field whose value indicates whether a transaction mode record is a new record or modifies an existing immediate mode record. For example, the presence of a null value in the RecParentID field of the record 202J of FIG. 2 indicates that the record is a new record. At step 810, new transaction mode records associated with the transaction are modified so that they will be recognized as immediate mode records. This may be accomplished, for example, by setting appropriate indicia and changing or removing elements unique to transaction mode records. For example, in the selection 200 of FIG. 2, the record 202S can be changed to immediate mode by changing the TransID field to a null value.

At step 812, transaction mode records that modify existing immediate mode records are identified, and the immediate mode record with which each such transaction mode record is identified. For example, in the case of the selection 200 of FIG. 2, the values of the RecParentID field in the records 202K, 202L, and 202M refer to the immediate mode records 202A, 202B, and 202C, respectively.

At step 814, a negated transaction is defined. The negated transaction suitably uses as an identifier the negative of the transaction identifier of the transaction being posted. For example, if transaction 3 is being posted, the negated transaction record created during posting will have −3 as its identifier. The transaction definition record defining the negated transaction suitably includes a null value for the scheduled posting date, because it is not scheduled to be posted at any definite time, but only when a decision is made to reverse the previous posting.

At step 816, for each immediate mode record associated with a transaction mode record identified at step 812, a negated transaction mode record is created. A negated transaction mode record suitably includes a reference to the negated transaction with which it is associated. For example, for a negated transaction mode record associated with the negated transaction having −3 as an identifier, the value appearing in a field such as the TransID field will be −3. Such a value identifies the transaction with which it is associated, and also identifies the record as a negated transaction mode record.

The negated transaction record also includes substantive data stored at the immediate mode record whose information is to be preserved. In addition, a negated transaction mode record includes as its identifier the negative of the identifier of the immediate mode record to which it corresponds. At step 818, after the negated transaction mode records are created, each immediate mode record associated with a transaction mode record is belonging to the transaction is updated to reflect the contents of its associated transaction mode record. This updating is accomplished, for example, by substituting the values in appropriate fields of the transaction mode record for those of the immediate mode record being changed. In the case of a transaction mode record that is to delete an associated immediate mode record, updating is accomplished by setting the value of RecID to 0 in the associated immediate mode record, while setting the value of RecParentActive to a null value appropriate for an immediate mode record.

FIG. 9 illustrates a table 900, illustrating the posting of the transaction mode records 202J-202M of the selection 200 of FIG. 2, along with the creation of negated transaction mode records to allow for reversibility of the posting. The table 900 includes immediate mode records 202A-202E and 902F. The records 202A-202C are the same records 202A-202C of FIG. 2, but have been updated as a result of posting the records 202K-202M of FIG. 2. The record 202A has been effectively deleted, because the value of RecParentActive in the record 202K was 0. Posting of the record 202K caused the value of RecActive to be changed to 0 for the record 202A, thereby effectively deleting the record 202A. In the present illustration, the values of the record 202A are shown as struck through, to show deletion.

The records 202D and 202E are unchanged from FIG. 2. The record 902F is a new immediate mode record, containing the information of the record 202J of FIG. 2. The records 902G-901 are negated transaction mode records, created to store the previously information contained in the records 202A-202C before they were updated. The records 202A-202E and 902F-902I include various information fields similar to those of FIG. 2, here labeled as columns 910A-910I.

The records 902G-902I include the value of RecID in column 910A, and the value of TransID in column 910F. The value of TransID is the identifier for the negated transaction with which the records 902G-902I are associated, that is, −3. The records 902G-902I include the values of the records 202A-202C before they were changed. The values stored in the negated transaction mode records 902G-902I will return the values of the records 202A-202C to their previous states. Specifically, the negated transaction mode record 902G will change the record 202A to an active state, because it stores a value for RecParentActive of 1. The negated transaction mode records 902H and 902I will restore the original price values for the immediate mode records 202B and 202C. Posting of the transaction −3 will have the effect of restoring the records 902A-902C to their original state.

FIG. 10 illustrates a process 1000 of unposting a previously posted transaction that has been previously posted to create or update immediate mode records. At step 1002, the transaction definition record for a transaction that is desired to be unposted is examined. At step 1004, transaction mode records associated with the transaction are assembled. At step 1006, a negated transaction associated with the posted transaction is identified. Suitably, a transaction definition record defining a negated transaction will identify the posted in connection with which the negated transaction was created, because the identifier of the negated transaction will be the negative of the identifier of the posted transaction. At step 1008, the negated transaction thus identified is posted in order to return the values of the associated immediate mode records to their original state. At step 1010, the negated transaction is deleted. At step 1012, the immediate mode records that were created at posting of the transaction are deleted. These records may be identified, for example, by first identifying transaction mode records in the original transaction that represent newly created records, and identifying immediate mode records matching these transaction mode records.

While the present invention is disclosed in the context of a presently preferred embodiment, it will be recognized that a wide variety of implementations may be employed by persons of ordinary skill in the art consistent with the above discussion and the claims which follow below.

I claim:

1. A computer implemented method for managing data in a database where the database is stored and maintained in a computer data server, the method comprising the steps of:

creating a plurality of immediate mode records in the database for relatively permanent storage of data where each of the plurality of immediate mode records includes pricing information;

creating a plurality of transaction definition records in the database where each of the transaction definition records includes a rule for supplementing or modifying the data stored in one or more of the plurality of immediate mode records;

creating a plurality of transaction mode records in the database where each of the plurality of transaction mode records is associated with one immediate mode record, a transaction and one transaction definition record and where each of the plurality of transaction mode records includes transaction data;

creating and populating a data structure by applying additions and changes reflected in transaction mode records associated with the transaction, where creating and populating the data structure is accomplished using additions and changes applied to data retrieved from immediate mode records without modifications to immediate mode records, where creating and populating the data structure further includes posting transaction data reflected in transaction mode records associated with the transaction to create new or modify immediate mode records, where creating and populating the data structure also includes using data retrieved from the new or modified immediate mode records, where creating and populating the data structure further includes exclusion of one or more immediate mode records from the data structure where transaction mode records includes transaction data excluding the one or more associated immediate mode records and wherein the exclusion of one or more immediate mode records from the data structure includes creation of one or more transaction mode records each associated with an immediate mode record where the one or more transaction mode records include indicia indicating exclusion of the associated immediate mode record; and retrieving data from a first of the plurality of immediate mode records and using a first of the plurality of transaction mode records associated with the first immediate mode record to apply the rule of a first of the plurality of transaction definition records associated with the first transaction mode record to supplement or modify the retrieved data using the transaction data from the first transaction mode record without applying the rule for supplementing or modifying the data stored in the first immediate mode record.

2. A system for managing data in a database, comprising:

a computer readable medium storing instructions for the steps of:

creating a plurality of immediate mode records in the database for relatively permanent storage of data in a central location where each of the plurality of immediate mode records includes price information for an item;

defining a transaction in the database;

creating a plurality of transaction mode records in the database, each transaction mode record including: a field storing values referring to an identifier for the transaction and a field storing values referring to an identifier for an immediate mode record;

creating and populating a data structure by applying additions and changes reflected in transaction mode records associated with the transaction, where creating and populating the data structure is accomplished using additions and changes applied to data retrieved from immediate mode records without modifications to immediate mode records, where creating and populating the data structure further includes posting transaction data reflected in transaction mode records associated with the transaction to create new or modify immediate mode records, where creating and populating the data structure also includes using data retrieved from the new or modified immediate mode records, where creating and populating the data structure further includes exclusion of one or more immediate mode records from the data structure where transaction mode records includes transaction data excluding the one or more associated immediate mode records and wherein the exclusion of one or more immediate mode records from the data structure includes creation of one or more transaction mode records each associated with an immediate mode record where the one or more transaction mode records include indicia indicating exclusion of the associated immediate mode record; and retrieving data from one of the plurality of immediate mode records and following commands associated with the transaction to modify the data retrieved from the one of the plurality of immediate mode records with the transaction mode records associated with the transaction without modifying data stored in the one of the plurality of immediate mode records.

3. A system for management of item pricing data, comprising:

a database for hosting the data in data structures where the data structures includes a plurality of database records including immediate mode records stored in relatively permanent form in the database and transaction mode records where each of the transaction mode records includes transaction data and is associated with one of the immediate mode records and a transaction definition record defining the treatment and use of each of the transaction mode records; and a processing system for storing the data to and retrieving the data from the database, the processing system comprising:

a processor; and a memory;

where the processing system stores data in an immediate mode record and an associated transaction mode record, the transaction mode record having no immediate effect to modify or to update the data stored in the immediate mode record as defined by an associated transaction definition record and where the processing system retrieves data from the immediate mode record and applies to the retrieved data, transaction data from the transaction mode record as defined by the associated transaction definition record to modify or update the data retrieved from the immediate mode record and where the processing system creates and populates a data structure by applying additions and changes reflected in transaction mode records associated with transaction definition records, where creating and populating the data structure is accomplished using additions and changes applied to data retrieved from immediate mode records without modifications to immediate mode records, where creating and populating the data structure further includes posting transaction data reflected in transaction mode records to create new or modify immediate mode records, where creating and populating the data structure also includes using data retrieved from the new or modified immediate mode records, where creating and populating the data structure further includes exclusion of one or more immediate mode records from the data structure where transaction mode records includes transaction data excluding the one or more associated immediate mode records and wherein the exclusion of one or more immediate mode records from the data structure includes creation of one or more transaction mode records each associated with an immediate mode record where the one or more transaction mode records include indicia indicating exclusion of the associated immediate mode record.

* * * * *